United States Patent [19]

Takigawa et al.

[11] 4,200,134

[45] Apr. 29, 1980

[54] HEAVY DUTY PNEUMATIC RADIAL TIRE WITH STRESS MITIGATING RIB

[75] Inventors: Hiroyoshi Takigawa, Kodaira; Mitsuhisa Yahagi, Sayama, both of Japan

[73] Assignee: Bridgestone Tire Company Limited, Tokyo, Japan

[21] Appl. No.: 895,824

[22] Filed: Apr. 13, 1978

[30] Foreign Application Priority Data

Apr. 18, 1977 [JP]  Japan ................................. 52-43457

[51] Int. Cl.² ............................................. B60C 11/06
[52] U.S. Cl. .............................. 152/209 R; 12 D/136
[58] Field of Search ....................... 152/209 D, 209 R; 12 D/136, 141, 142, 145, 143

[56] References Cited

U.S. PATENT DOCUMENTS

| | | | |
|---|---|---|---|
| 3,763,911 | 10/1973 | Montagne | 152/209 R |
| 3,813,654 | 8/1974 | Boileau | 152/209 R |

*Primary Examiner*—Richard A. Bertsch
*Attorney, Agent, or Firm*—Sughrue, Rothwell, Mion, Zinn and Macpeak

[57] ABSTRACT

A heavy duty pneumatic radial tire is disclosed. This tire has a tread pattern formed in a tread divided into zigzag circumferential ribs by at least two zigzag main grooves. The tread includes a stress-mitigating rib arranged at least near the top of the convex part of the circumferential rib and parallel to the edge line of the circumferential rib through substantially an isolation groove.

3 Claims, 7 Drawing Figures

HEAVY DUTY PNEUMATIC RADIAL TIRE WITH STRESS MITIGATING RIB

BACKGROUND OF THE INVENTION

1. Field of the Invention:

This invention relates to heavy duty pneumatic radial tires and is to diminish railway wears being apt to occur in such tires when continuously travelling at a high speed over a long distance.

2. Description of the Prior Art:

In general, radial tires of this type provided with metal cords as a belt reinforcement have excellent resistance to wear, puncture and the like as compared with conventional bias tires because they have a highly stiff belt arranged between the tread rubber and the carcass ply. On the other hand, the radial tires are somewhat defective in the comfort degree owing to the rigid reinforcing effect with such belt. Accordingly, these radial tires have been developed for use on good road aside from bad road. Recently, the demand for such tires in considerably increased in association with the remarkable improvement of road circumstances such as the development of networks of highways and the like.

In such applications, zigzag-type ribs extending circumferentially of tire are provided in the tread of tire considering traction and braking performances, general wear resistance, resistance to heat build-up and the like. Generally, the tire having such tread pattern is called as a rib-type tire.

In the rib-type tire, ribs are usually continuous toward the circumferential direction of tire and may be discontinuous toward the circumferential direction due to the presence of traverse grooves arranged along the widthwise direction of tire. In any case, when a vehicle provided with such tires goes continuously straight at a high speed over a long distance, there are caused extraordinarily irregular wears (hereinafter referred to as eccentric wear) which have never been observed in the conventional tires.

Namely, as shown in FIG. 1, the eccentric wear is locally caused in a shadowed region A near a top of a convex part 3 of a circumferential rib 2 formed in a tread of a tire T, said convex part being projected in a widthwise direction of the tire T toward a main groove 1 extending zigzag along a circumferential direction of the tread, and then gradually increases to form a region A having a stepwise height h and a width w in section as shown in FIG. 2. The region A of the eccentric wear gradually grows with the increase of the travelling distance and finally communicates with adjoining regions A. As a result, these regions are continuously joined with each other in the circumferential direction of tire. Moreover, the stepwise height h and the width w are gradually enlarged with the increase of the travelling distance.

The above eccentric wear is generally called as a railway wear, which produces not only the recess on the main groove 1 to render the appearance of the tire T awkward, but also adversely affects tire performances, particularly traction and braking performances depending upon the function of an edge line of the rib 2 partitioned by the main groove 1 and further considerably deteriorates the life of tire.

The eccentric wear begins to occur only in the vicinity of the top at the convex part 3 of the zigzag-type circumferential rib 2 and does not start from a concave part 4 of the circumferential rib 2 in opposition to the convex part 3 along the widthwise direction of the tire T. However, the concave part 4 is also subjected to railway wear in due time with the evolution of the eccentric wear.

SUMMARY OF THE INVENTION

The inventors have pursued the cause of the railway wear in rib-type heavy duty pneumatic radial tires of various sizes and as a result, there has been found a new fact which is inconceivable until now.

That is, such new fact is that the railway wear is an inherent phenomenon in the case of continuously travelling the rib-type tire provided with highly stiff metal cords as a belt reinforcement at a high speed and hardly occurs when such tire is used on general road under discontinuous travelling at a low speed or on bad road and the like causing a considerable degree of wear. Therefore, the inventors have aimed at the fact that the vicinity of the top at the convex part 3 of the circumferential rib 2 projecting toward the main groove 1 in the widthwise direction of the tire T undergoes a transverse stress concentration owing to the occurrence of railway wear when continuously travelling straight at a high speed and have made various countermeasures.

As a result, the inventors have found out that the stress applied to the vicinity of the top at the convex part 3 of the circumferential rib 2 can be diminished by providing a stress-mitigating rib near such top as a defense member, whereby the formation of railway wear nucleus and its propagation in circumferential and radial directions can be prevented.

According to the invention, there is provided a heavy duty pneumatic radial tire having a tread pattern formed in a tread divided into a plurality of continuous or discontinuous zigzag circumferential ribs along a widthwise direction of tire by at least two, relatively wide and substantially zigzag main grooves extending circumferentially of the tread, each of said main grooves comprising a stress-mitigating rib arranged at least near a top of a convex part of said circumferential rib projecting toward said main groove in the widthwise direction of the tire, said stress-mitigating rib being substantially separated from the circumferential rib through an isolation groove and being substantially parallel to an edge line of said convex part of the circumferential rib.

BRIEF DESCRIPTION OF THE DRAWINGS

The invention will now be described in greater detail with reference to the accompanying drawings, wherein:

FIG. 3b is a cross-sectional view taken along line III—III in FIG. 3a; and

DESCRIPTION OF THE PREFERRED EMBODIMENTS

Figure 3:
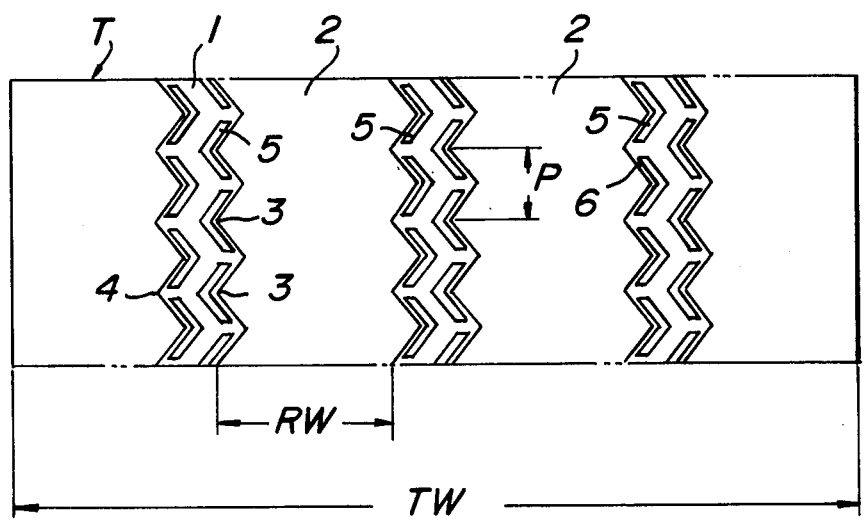
FIG. 3 is a partial schematic view of an embodiment of the tread pattern according to the invention.

In FIG. 3 is partly shown an embodiment of the tread in the heavy duty pneumatic radial tire according to the invention.

A stress-mitigating rib 5 is located in a relatively wide main groove 1 near a top of a convex part 3 of a circumferential rib 2 projecting toward the main groove 1 is a widthwise direction of the tread and opposite to the convex part 3 as shown in FIG. 3.

The term "circumferential rib" used herein means one having a rib width RW corresponding to at least 10% of a tread with TW measured in a direction perpendicular to the circumferential direction of the tire. When the rib width RW is less than 10%, the rigidity in the circumferential direction of the tread becomes small and the eccentric wear hardly occurs, so that circumferential ribs having such small rib width are excluded according to the invention. Of course, circumferentially discontinuous ribs are included as the circumferential rib 2 in the invention. In this case, it is necessary that the rib width RW satisfies the above relationship at a zone defined between the two main grooves 1 in the widthwise direction of the tread.

Figure 3A:
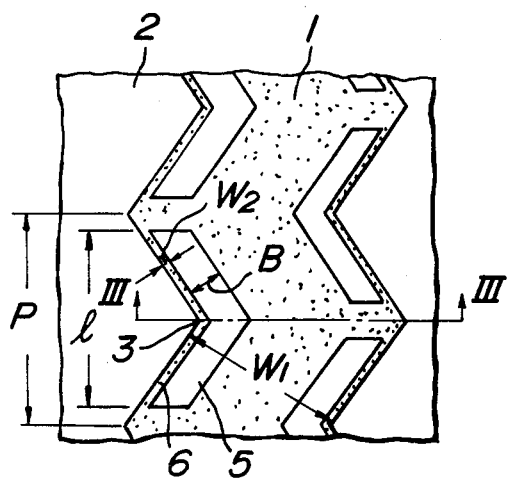
FIG. 3a is a partly detailed view of FIG. 3.
Figure 3B:
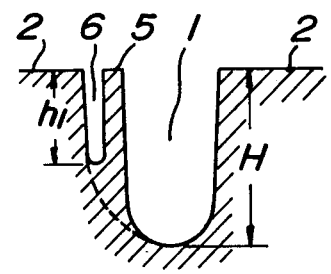

The stress-mitigating rib 5 will be further described in detail. As shown in FIGS. 3a and 3b, the stress applied to the vicinity of the convex part 3 is considerably diminished by providing the stress-mitigating rib 5 apart from the circumferential rib 2 near the convex part 3 thereof and parallel to an edge line of the convex part 3 as a defense member. Particularly, better results can be obtained when the stress-mitigating rib 5 satisfies the following relations. That is, a length l of the rib 5 in the circumferential direction of the tread is within a range of 0.60 to 0.95 based on a pitch P of zigzags of the main groove 1 and a width B of the rib 5 is within a range of 0.10 to 0.20 based on a width $W_1$ of the main groove 1. Furthermore, there is provided an isolation groove 6 for separating the stress-mitigating rib 5 from the circumferential rib 2. A width $W_2$ of the groove 6 is within a range of 0.02 to 0.05 based on the width $W_1$ of the main groove 1 and a depth $h_1$ of the groove 6 is within at least 30% of a depth H of the main groove 1.

According to the invention, by providing the narrow stress-mitigating rib 5 separated from the circumferential rib 2 opposite to the convex part 3 of the rib 2 as mentioned above, the formation of railway wear nucleus in the top of the convex part 3 is suppressed, or if partly formed, the propagation of the nucleus can effectively be suppressed.

From various examinations, it has been confirmed that when the length l of the stress-mitigating rib is less than 60% of the zigzag pitch P of the main groove 1, there is no stress-diminishing effect. While, when the length l exceeds 95%, there is no great difference in the stress-diminishing effect on the one hand and the wear state during the travelling becomes undesirable in the appearance on the other hand. Therefore, it is preferable that the length l of the stress-mitigating rib is within the above range based on the zigzag pitch P of the main groove.

Futhermore, when the width B of the stress-mitigating rib 5 is smaller than 10% of the width $W_1$ of the main groove 1, it is very difficult to produce such stress-mitigating rib and at the same time, that rib is apt to cut during the travelling. While, when the width B exceeds 20%, there is obtained the effect for diminishing the stress, but various drawbacks such as obstruction of draining function in the main groove 1 and the like are caused. Moreover, if the width B is too large, wear caused in the stress-mitigating rib itself is conspicuous and the appearance thereof becomes awkward.

When the depth $h_1$ of the isolation groove 6 is smaller than 30% of the depth H of the main groove 1, the function of the stress-mitigating rib 5 is not developed. While, the depth $h_1$ of the isolation groove 6 may be substantially equal to the depth H of the main groove 1.

From various examinations, it has been confirmed that the width $W_2$ of the isolation groove 6 is preferable to be within a range of 2% to 5% based on the width $W_1$ of the main groove 1. When the width $W_2$ is smaller than 2%, there is caused a problem in the production of the isolation groove 6, while when the width $W_2$ exceeds 5%, the spacing between the circumferential rib 2 and the stress-mitigating rib 5 is too large and as a result, the function of the stress-mitigating rib is not developed.

According to the invention, the widths of the main groove 1, isolation groove 6 and stress-mitigating rib 5 are measured in a direction perpendicular to the edge line of the circumferential rib in the tread of tire.

Figure 4:
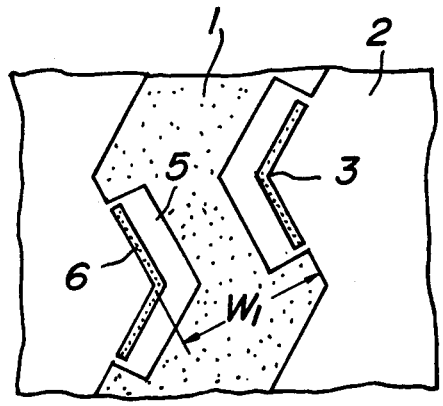
FIGS. 4 and 5 are partial schematic views of another embodiments of the tread pattern according to the invention, respectively.
Figure 5:
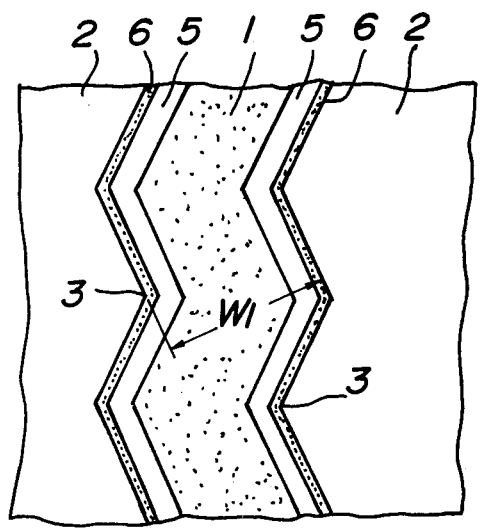

In FIGS. 4 and 5 are partly shown another embodiments of the stress-mitigating rib 5 according to the inventions, respectively. In the embodiment of FIG. 4, a part of the stress-mitigating rib 5 is connected to the corresponding portion of the edge line of the convex part 3 in the cirumferential rib 2. In the embodiment of FIG. 5, the stress-mitigating rib 5 is continuous in the circumferential direction of the tread. In any case, the effect of diminishing the stress is the same as in the embodiment of FIG. 3. In these embodiments, the width $W_1$ of the main groove 1 may be considered to be a distance between the adjoining circumferential ribs 2 irrespective of the presence of the stress-mitigating rib 5.

Then, the railway wear was actually tested with respect to the tires of the prior art and the invention to obtain the following results.

1. Tire of the prior art:
   Size: 10.00R20, 14PR rib-type
   Construction: number of main groove=4
2. Tire of the invention:

The size, construction of belt and carcass ply, shape and number of main groove 1 in the tread and the like are the same as used in the tire of the prior art except that the stress-mitigating rib 5 is arranged near the top of the convex part 3 in each circumferential rib 2 and opposite thereto as shown in FIG. 3. The size of the stress-mitigating rib 5 is as follows:
   l/P=0.90 (P=10 mm, l=9 mm)
   $B/W_1$=0.17 ($W_1$=12 mm, B=2 mm)
   $W_2/W_1$=0.04 ($W_2$=0.5 mm)
   $h_1/H$=0.41 ($h_1$=6 mm, H=14.6 mm)

Test conditions:
   Vehicle: large-sized truck.
   Load: maximum load.
   Inner pressure: 7.25 kg/cm$^2$.
   Road course: high speed road 70%, general road 30%.
   Speed: 80 km/hr for high speed road, 40 km/hr for general road.
   Travelling distance: 35,000 km.
   Mounting position for tire: front wheel (the tires were changed in its right and left positions every 5,000 km.)

Figure 1:
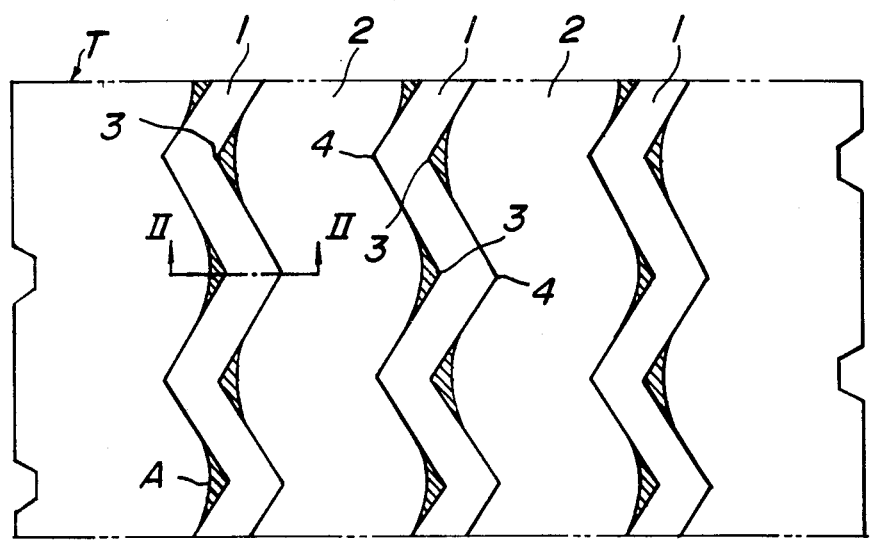
FIG. 1 is a partial schematic view illustrating the eccentric wear caused in the conventional heavy duty pneumatic radial tire.
Figure 2:
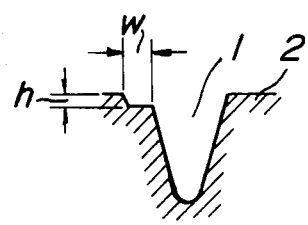
FIG. 2 is a cross-sectional view taken along the line II—II in FIG. 1.

Test result:

The degree of railway wear is measured to obtain a result expressed by h and w defined in FIG. 2 as shown in the following table.

|  | h (stepwise height) | w (width) |
|---|---|---|
| Tire of the prior art | 1.7 mm | 5.0 mm |
| Tire of the invention | 0.3 mm | 0.5 mm |

As seen from the above data, the invention can considerably diminish the railway wear caused in the tire of the prior art.

According to the invention, there is provided a novel tread pattern capable of effectively diminishing the stress applied to the convex part of the zigzag circumferential rib opposite to the main groove in the rib-type tire and effectively suppressing the propagation of railway wear when continuously travelling at a high speed for a long time.

What is claimed is:

1. In a heavy duty pneumatic radial tire having a tread divided into a plurality of zigzag circumferential ribs along a widthwise direction of the tire by at least two, relatively wide and substantially zigzag main grooves extending circumferentially of said tread, the improvement which comprises: the width of each circumferential rib being at least 10% of the tread width measured in a direction perpendicular to a circumferential direction of the tire, and a stress-mitigating rib arranged at least near a top of each convex part of said circumferential rib projecting toward said main groove in said widthwise direction of the tire, said stress-mitigating rib being substantially parallel to an edge line of said convex part, spaced from said circumferential rib by an isolation groove, having an outer surface co-planar with the outer surface of the adjacent circumferential rib, and satisfying the following relations:

$B/W_1 = 0.10$ to $0.20$
$W_2/W_1 = 0.02$ to $0.05$ in which $W_1$ is a width of said main groove measured in a direction perpendicular to the edge line of said circumferential rib, $W_2$ is a width of said isolation groove and B is a width of said stress-mitigating rib.

2. A tire as set forth in claim 1, wherein said isolation groove has a depth corresponding to not less than 30% of a depth of said main groove.

3. A tire as set forth in either one of claims 1 or 2, wherein said stress-mitigating rib satisfies the following relation:

$l/P = 0.60$ to $0.95$ in which P is the pitch of the zigzags of said main groove, and l is the length of said isolation groove in the circumferential direction of the tread.

* * * * *